(12) United States Patent
Nakahara et al.

(10) Patent No.: US 11,388,138 B2
(45) Date of Patent: Jul. 12, 2022

(54) COMMUNICATION SYSTEM, ADDRESS NOTIFICATION APPARATUS, COMMUNICATION CONTROL APPARATUS, TERMINAL, COMMUNICATION METHOD, AND PROGRAM

(71) Applicant: NTT Communications Corporation, Chiyoda-ku (JP)

(72) Inventors: Yuuki Nakahara, Nerima-ku (JP); Kensaku Komatsu, Chofu (JP)

(73) Assignee: NTT Communications Corporation, Chiyoda-ku (JP)

( * ) Notice: Subject to any disclaimer, the term of this patent is extended or adjusted under 35 U.S.C. 154(b) by 91 days.

(21) Appl. No.: 15/767,909

(22) PCT Filed: Oct. 13, 2016

(86) PCT No.: PCT/JP2016/080450
§ 371 (c)(1),
(2) Date: Apr. 12, 2018

(87) PCT Pub. No.: WO2017/065244
PCT Pub. Date: Apr. 20, 2017

(65) Prior Publication Data
US 2018/0302370 A1 Oct. 18, 2018

(30) Foreign Application Priority Data
Oct. 14, 2015 (JP) .............................. JP2015-203061
Oct. 13, 2016 (JP) .............................. JP2016-201841

(51) Int. Cl.
*G06F 15/16* (2006.01)
*H04L 61/2546* (2022.01)
(Continued)

(52) U.S. Cl.
CPC ...... *H04L 61/2546* (2013.01); *H04L 61/2535* (2013.01); *H04L 61/2567* (2013.01);
(Continued)

(58) Field of Classification Search
CPC ............. H04L 61/2546; H04L 61/2535; H04L 61/2567; H04L 61/2589; H04L 61/2575; H04L 61/6077; H04L 61/2514
See application file for complete search history.

(56) References Cited

U.S. PATENT DOCUMENTS 7,302,496 B1    11/2007  Metzger
2005/0105543 A1*  5/2005  Ikenaga ............. H04L 61/2514
                                                     370/428
(Continued)

FOREIGN PATENT DOCUMENTS

JP    2011-188358 A    9/2011
JP    2011-525776 A    9/2011
(Continued)

OTHER PUBLICATIONS

Extended European Search Report dated Mar. 20, 2019 in European Patent Application No. 16855497.0, citing documents.
(Continued)

*Primary Examiner* — Suraj M Joshi
*Assistant Examiner* — Jaren Means
(74) *Attorney, Agent, or Firm* — Oblon, McClelland, Maier & Neustadt, L.L.P.

(57) ABSTRACT

A communication system including a first address notification apparatus provided in a first communication network, and a second address notification apparatus provided in a second communication network, wherein the first address notification apparatus includes means that receives an address request from a terminal that can communicate with the first address notification apparatus and with the second
(Continued)

address notification apparatus, obtains a source address from the address request, and transmits a response including the source address to the terminal, and the second address notification apparatus includes means that receives an address request from the terminal, obtains a source address from the address request, and transmits a response including the source address to the terminal.

7 Claims, 11 Drawing Sheets

(51) Int. Cl.
*H04L 61/2567* (2022.01)
*H04L 61/2521* (2022.01)
*H04L 61/2589* (2022.01)
*H04L 61/2575* (2022.01)
*H04L 61/2514* (2022.01)
*H04L 101/677* (2022.01)

(52) U.S. Cl.
CPC ...... *H04L 61/2575* (2013.01); *H04L 61/2589* (2013.01); *H04L 61/2514* (2013.01); *H04L 61/6077* (2013.01)

(56) References Cited

U.S. PATENT DOCUMENTS

| | | | | |
|---|---|---|---|---|
| 2005/0251577 | A1* | 11/2005 | Guo | H04L 67/104 709/230 |
| 2005/0259637 | A1* | 11/2005 | Chu | H04L 29/12009 370/352 |
| 2009/0319674 | A1 | 12/2009 | Yahyaoui et al. | |
| 2012/0036192 | A1* | 2/2012 | Abuan | H04L 67/104 709/204 |
| 2014/0195696 | A1 | 7/2014 | Miyama et al. | |
| 2016/0094591 | A1* | 3/2016 | Moore | H04L 61/2564 709/228 |

FOREIGN PATENT DOCUMENTS

| | | |
|---|---|---|
| JP | 2014-135592 A | 7/2014 |
| JP | 2015-89053 A | 5/2015 |
| JP | 2015-153076 A | 8/2015 |

OTHER PUBLICATIONS

Martinsen, P., et al., "ICE IPv4/IPv6 Dual Stack Fairness; draft-martinsen-mmusic-ice-dualstack-fairness-02.txt", Internet Engineering Task Force, IETF; Standardworkingdraft, Internet Society, Feb. 9, 2015, XP015104685, pp. 1-9.

Singh, V., et al., "Multipath RTP (MPRTP) attribute in Session Description Protocol; draft-singh-mmusic-mprtp-sdp-extension-04.txt", Multipath RTP (MPRTP) Attribute in Session Description Protocol; Internet Engineering Task Force, IETF; Standardworkingdraft, Internet Society, XP015101914, Sep. 30, 2014, pp. 1-23.

Thatcher, P., et al., "ICE Network Cost:: Dynamically Selecting ICE candidate pairs based on relative cost of network interfaces; draft-thatcher-ice-network-cost-01.txt", Internet Engineering Task Force, IETF; Standardworkingdraft, Internet Society (ISOC) 4, Sep. 19, 2016, XP015115324, pp. 1-6.

J. Rosenberg, et al., "Request for Comments: 5389, Session Traversal Utilities for NAT (STUN)," Network Working Group, Oct. 2008, pp. 1-51.

J. Rosenberg, "Request for Comments: 5245, Interactive Connectivity Establishment (ICE): A Protocol for Network Address Translator (NAT) Traversal for Offer/Answer Protocols," Internet Engineering Task Force (IETF), ISSN: 2070-1721, Apr. 2010, pp. 1-117.

Toshio Hiraga, "On-Site Know-How in Case of Emergency: Enhance Internet connection with multihoming (1) Simple Redundancy With Appliances No Use Restrctions With BGP," Nikkei Communications, No. 400, Oct. 13, 2003, (10 pages) (with Partial English Translation).

International Search Report dated Dec. 27, 2016 in PCT/JP2016/080450 filed Oct. 13, 2016.

Japanese Office Action dated Dec. 5, 2017 in JP Application No. 2017-007953.

* cited by examiner

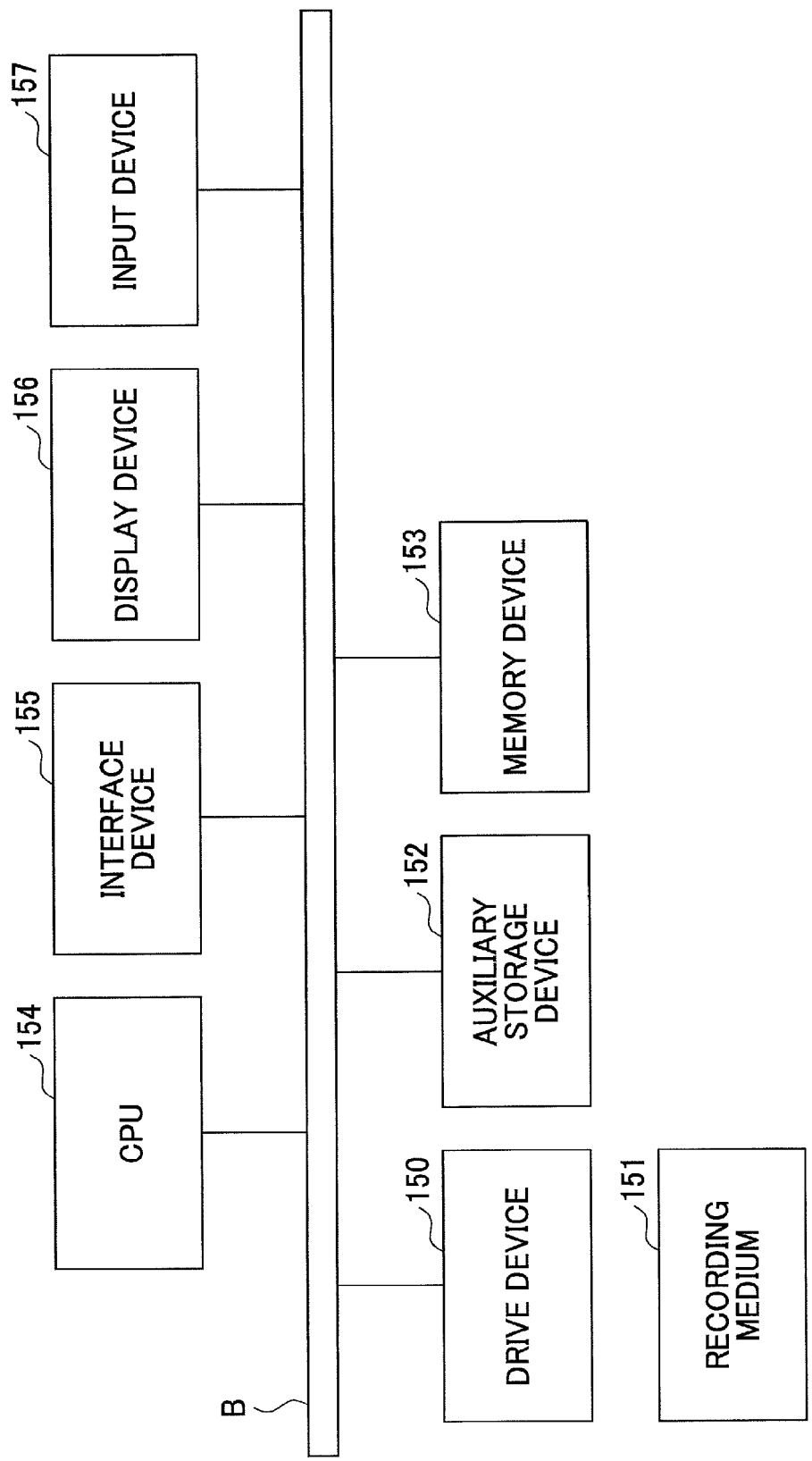

COMMUNICATION SYSTEM, ADDRESS NOTIFICATION APPARATUS, COMMUNICATION CONTROL APPARATUS, TERMINAL, COMMUNICATION METHOD, AND PROGRAM

TECHNICAL FIELD

The present invention relates to a technique for performing P2P communication between terminals.

BACKGROUND ART

In recent years, P2P communication in which communication is performed by connecting terminals with each other has become widespread. There are various techniques as techniques for realizing P2P communication. For example, there is WebRTC that realizes P2P communication between browsers of terminals without using any special applications.

P2P communication using WebRTC or the like is generally performed via the Internet. When performing P2P communication between a terminal A and a terminal B via the Internet, a packet transmitted from the terminal A is sent to a router for Internet connection of an ISP (Internet Service Provider) via an access network, and is sent from the router to the Internet. Then, the packet arrives at the router of an ISP on the terminal B side and is delivered to the terminal B via an access network.

RELATED ART DOCUMENT

Non Patent Document

[NON PATENT DOCUMENT 1] RFC5389 (STUN)
[NON PATENT DOCUMENT 2] RFC5245 (ICE)

SUMMARY OF THE INVENTION

Problem to be Solved by the Invention

In the P2P communication as described above, for example, if the use ISP of the terminal A is different from the use ISP of the terminal B, even when the terminal A and the terminal B are located at geographically close positions (example: within the same city), there is a possibility that the P2P communication between the terminal A and the terminal B is performed via a point of connection between ISPs at a remote place or via an IX.

As described above, in the conventional technique relating to P2P communication, there is a problem that there is a possibility that an appropriate communication path is not selected. Note that such a problem relating to P2P communication is not limited to communication using the access network and the Internet but can also occur in communication using other networks.

The present invention has been made in view of the above-problem, and an object of the present invention is to provide a technique in which a communication route used for P2P communication between terminals is properly selected.

Means for Solving the Problem

According to an embodiment of the present invention, there is provided a communication system including a first address notification apparatus provided in a first communication network, and a second address notification apparatus provided in a second communication network, wherein the first address notification apparatus includes means that receives an address request from a terminal that can communicate with the first address notification apparatus and with the second address notification apparatus, obtains a source address from the address request, and transmits a response including the source address to the terminal, and the second address notification apparatus includes means that receives an address request from the terminal, obtains a source address from the address request, and transmits a response including the source address to the terminal.

According to an embodiment of the present invention, there is provided an address notification apparatus functioning as a first address notification apparatus provided in a first communication network in a communication system including the first address notification apparatus provided in the first communication network, and a second address notification apparatus provided in a second communication network, including:

obtaining means that receives an address request from a terminal being able to communicate with the first address notification apparatus and with the second address notification apparatus, transmitting an address request to the second address notification apparatus and transmitting an address request to the first address notification apparatus, and obtains a source address from the address request; and address notification means that transmits a response including the source address to the terminal.

According to an embodiment of the present invention, there is provided a communication control apparatus for use in a communication system including the communication control apparatus, a first address notification apparatus provided in a first communication network, and a second address notification apparatus provided in a second communication apparatus, including:

relay means that receives a set of addresses from a terminal that can communicate with the first address notification apparatus and the second address notification apparatus, and transmits the set of addresses to a communication partner terminal that is a communication partner of the terminal, wherein the set of addresses includes an address obtained from a response to an address request that is transmitted to the first address notification apparatus from the terminal, and an address obtained from a response to an address request that is transmitted to the second address notification apparatus from the terminal.

According to an embodiment of the present invention, there is provided a terminal that performs control communication with a communication system including a communication control apparatus, a first address notification apparatus provided in a first communication network, and a second address notification apparatus provided in a second communication network, including:

means that transmits an address request to the first address notification apparatus, receives a response including a source address of the address request from the first address notification apparatus, and obtains the source address from the response;

means that transmits an address request to the second address notification apparatus, receives a response including a source address of the address request from the second address notification apparatus, and obtains the source address from the response; and means that transmits, to the communication control apparatus, a set of addresses including the addresses obtained from each of the responses received from the first address notification apparatus and the second address notification apparatus, wherein the communication control apparatus transmits the set of addresses received from the terminal to a communication partner terminal that is a communication partner of the terminal.

According to an embodiment of the present invention, there is provided a communication method executed in a communication system including a first address notification apparatus provided in a first communication network, and a second address notification apparatus provided in a second communication network, wherein the first address notification apparatus receives an address request from a terminal that can communicate with the first address notification apparatus and with the second address notification apparatus, obtains a source address from the address request, and transmits a response including the source address to the terminal, and the second address notification apparatus receives an address request from the terminal, obtains a source address from the address request, and transmits a response including the source address to the terminal.

According to an embodiment of the present invention, there is provided a communication system including a first communication control apparatus and a first address notification apparatus that are provided in a first communication network, and a second communication control apparatus and a second address notification apparatus that are provided in a second communication network, each of the first communication control apparatus and the second communication control apparatus including relay means that receives a set of addresses from a terminal that can communicate with the first address notification apparatus and the second address notification apparatus, and transmits the set of addresses to a communication partner terminal that is a communication partner of the terminal, wherein the set of addresses includes an address obtained from a response to an address request that is transmitted to the first address notification apparatus from the terminal, and an address obtained from a response to an address request that is transmitted to the second address notification apparatus from the terminal.

Effect of the Present Invention

According to an embodiment of the present invention, a communication route used for P2P communication between terminals is properly selected.

BRIEF DESCRIPTION OF THE DRAWINGS

FIG. 12 is a diagram showing an example of a hardware configuration.

EMBODIMENTS FOR CARRYING OUT THE INVENTION

In the following, an embodiment of the present invention is described with reference to figures. Note that the embodiment described below is merely an example, and embodiments to which the present invention is applied are not limited to the following embodiment.

In P2P communication described in the present embodiment, a pair of an IP address and a port number is used for specifying a destination of communication and the like. Hereinafter, for convenience, a pair of an IP address and a port number is referred to as "address". This may be referred to as "transport address". When referring to "IP address", it is described as "IP address", "IPv4 address", "IPv6 address" and the like.

(System Configuration)

Figure 1:
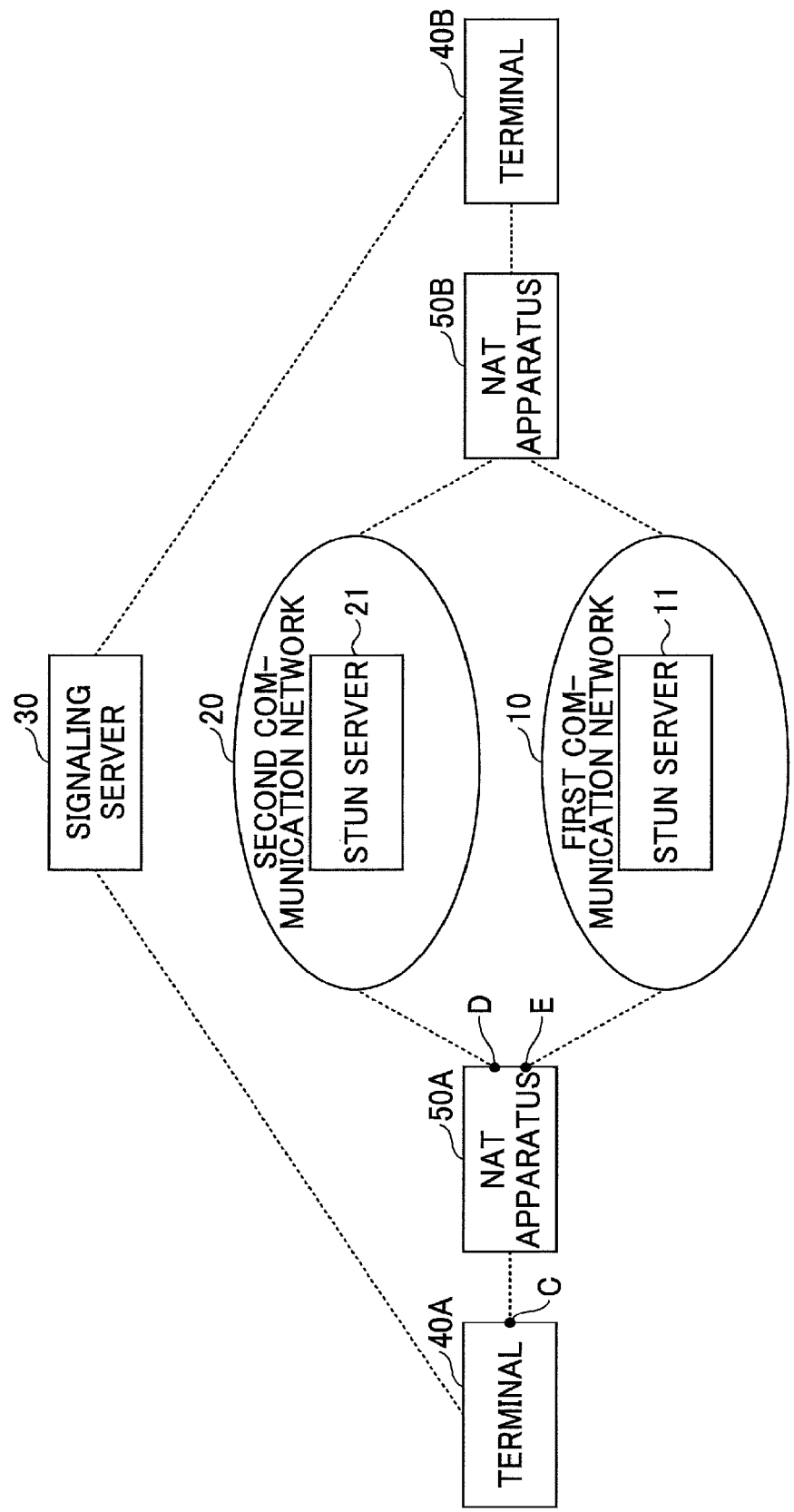
FIG. 1 is an overall block diagram of a communication system in an embodiment of the present invention.

FIG. 1 is an overall configuration diagram of a communication system according to an embodiment of the present invention. As shown in FIG. 1, the communication system according to the present embodiment includes a first communication network 10 and a second communication network 20.

In the first communication network 10 and the second communication network 20, IP addresses used for packet routing are different. Here, as the cases in which "IP addresses are different", there are cases in which, for example, when one uses "IPv4 address" and the other uses "IPv6 address", one uses a specific address band of "IP address", and the other uses another address band of the same type of "IP address", or the like. Also, as the cases in which "IP addresses are different", there are cases in which, one is "IP address" used in a global network such as the Internet and the other is "IP address" used in a network which is physically or logically separated from the global network, which is a closed network such as VPN, for example.

Each of the first communication network 10 and the second communication network 20 are not limited to a specific type of network, but in the present embodiment, for example, it is assumed that the first communication network 10 is an access network (example: NGN (Next Generation Network) network), and the second communication network 20 is the Internet. However, there are other use cases, which are described later. In FIG. 1, the first communication network 10 and the second communication network 20 are illustrated separately for the sake of convenience. In addition, the number of communication networks is not limited to two, and three or more communication networks may be provided.

As shown in FIG. 1, the communication system is provided with a terminal 40A and a terminal 40B which are terminals that perform P2P communication. In the present embodiment, it is assumed that each terminal is a terminal such as a general PC, a smartphone, a mobile phone, or IoT/M2M device such as sensor/actuator or the like, equipped with a browser or software having a WebRTC communication function corresponding to a browser, and video call and the like is performed by P2P communication using WebRTC. However, this is merely an example, and communication of data may be performed by P2P communication. Also, voice call may be performed by P2P communication. In the description of the present specification, video, data and voice and the like are collectively referred to as "media".

Further, a NAT apparatus 50A is placed at a site where the terminal 40A is provided, and a NAT apparatus 50B is placed at a site where the terminal 40B is provided. Basically, the NAT apparatus 50A/50B is an apparatus having a function for mutually converting an address (to be referred to as internal address) locally assigned in the terminal 40A/40B and an address (to be referred to as external address) used in the side of the first communication network 10/the second communication network 20. Note that it is not essential to provide the NAT apparatus 50A/50B, and the NAT apparatus 50A/50B may not be provided. Even when the first communication network 10/the second communication network 20 is a closed network, the address used in the side of the first communication network 10/the second communication network 20 is referred to as an external address.

As shown in FIG. 1, the communication system is provided with a signaling server 30. The signaling server 30 is an apparatus for relaying a control signal between the terminal 40A and the terminal 40B for the terminal 40A and the terminal 40B to establish a communication route (channel). Although detailed description is provided later, more specifically, when the terminal 40A and the terminal 40B decide an address pair for P2P communication, the signaling server 30 performs exchange of address candidates collected by each terminal between the terminal 40A and the terminal 40B, and the like. Each of the terminal 40A and the terminal 40B registers to the signaling server 30 and communicates with the signaling server 30.

The signaling server 30 may be placed anywhere as long as signaling between the terminal 40A and the terminal 40B can be executed. For example, the signaling server 30 may be placed in the first communication network 10, may be placed in the second communication network 20, or may be placed in other networks. The signaling server 30 may be referred to as "communication control apparatus".

Further, as shown in FIG. 1, the first communication network 10 is provided with a STUN server 11, and the second communication network 20 is provided with a STUN server 21. The STUN server 11 and the STUNB server 21 have the same function as a STUN server. However, an address of the first communication network 10 is allocated to the STUN server 11 and an address of the second communication network 20 is allocated to the STUN server 21. Note that the STUN server may be referred to as "address notification apparatus". Also, each network may be provided with a plurality of STUN servers. Also, the configuration including the STUN server 11 and the STUN server 21 may be referred to as "communication system".

Each STUN server is a server having a function of STUN described in the non-patent document 1, for example. As a basic function, each STUN server includes a function for receiving a binding request transmitted from a terminal, obtaining a source address from the packet of the request, including the source address in a binding response (address response) and transmitting the binding response to the source address. In the present embodiment, the source address is an external address after NAT conversion, for example. Accordingly, the terminal can know the external address of itself. By reporting the address to a communication partner, the communication partner can know the destination address to the terminal. If the NAT apparatus does not exist, a host address assigned to the terminal itself may be included in the binding response and the binding response may be returned.

The address included in the binding response and returned to the terminal is referred to as "Reflexive Transport Address".

STUN is one of techniques that can be used for NAT traversal, and as another technique, there is TURN (Traversal Using Relays around NAT), for example. TURN is a technique for enabling communication between terminals via a TURN server by placing the TURN server for relaying media packets in the communication network.

(On ICE)

In order to perform P2P communication between the terminal 40A and the terminal 40B, both terminals need to know each other's address. Therefore, each terminal in the present embodiment determines an address to be used for P2P communication by using a protocol called ICE (Interactive Connectivity Establishment) described in Non-Patent Document 2.

In the ICE, each terminal collects usable addresses by STUN, TURN, or the like, exchanges the collected addresses among terminals, performs connection check (hole punching) to each other, and performs communication by selecting an address of the highest priority from among addresses by which communication can be performed. As to the priority order of selection, for example, the address of itself is the highest (that is, the case in which local communication is performed without passing though the NAT apparatus), an external address notified by the STUN server is the next, and an address for performing communication via the TURN server is the next. More specific examples will be described later. In the present embodiment, for convenience, TURN is not considered.

The type (Type) of the address of the terminal itself is called "host", and the type (Type) of the address of STUN is called "server reflexive". "Server reflexive" may be described as "srflx" by omitting a part.

BASIC PROCEDURE EXAMPLE

Figure 2:
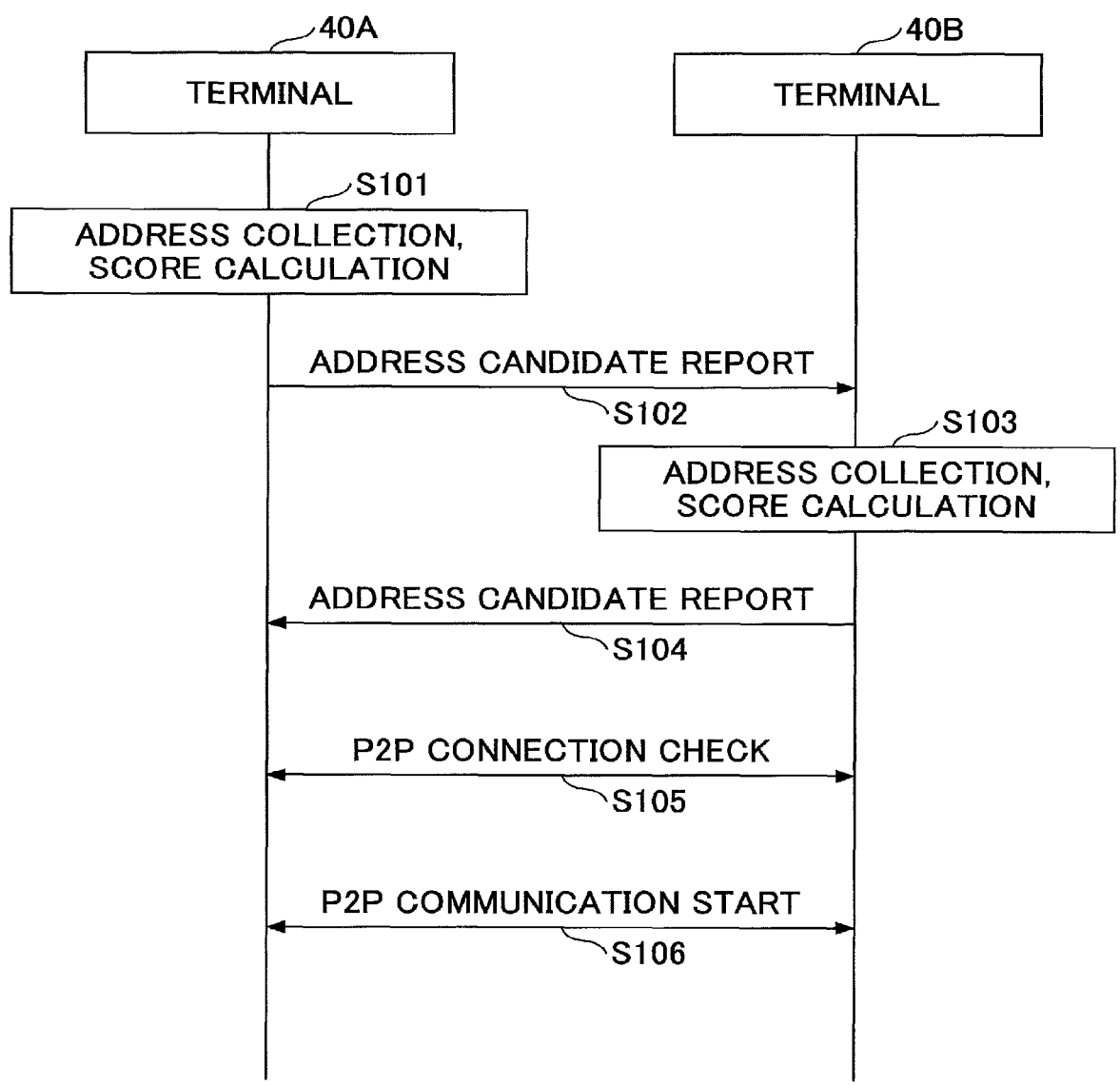
FIG. 2 is a sequence diagram for explaining a basic procedure example of ICE.

With reference to FIG. 2, a basic procedure example of ICE executed between the terminal 40A and the terminal 40B in the present embodiment is described. Note that this procedure is merely an example. Instead of the procedure shown in FIG. 2, for example, a procedure may be used in which an obtained candidate is immediately sent to the partner to perform connection check immediately. The procedure shown in FIG. 2 is executed via the signaling server 30, but the description of the signaling server 30 is omitted.

In step S101, the terminal 40A performs address collection. Specifically, the terminal 40A first obtains an address assigned to itself. This address is described as "address (host) A" in the sense of host address of the terminal 40A side. Hereinafter, similar description is used. In the following, the address on the side of the first communication network 10 is referred to as "first address" and the address on the side of the second communication network 20 is referred to as "second address".

In the terminal 40A, an address of the STUN server 11 and an address of the STUN server 21 are set (stored) beforehand. The terminal 40A transmits a binding request to the STUN server 11 and receives a binding response to obtain the first address (srflx) A, and transmits a binding request to the STUN server 21 and receives a binding response to obtain the second address (srflx) A.

The above example is an example of a method of sending a binding request by directly designating the address (IP address) of the STUN server. In addition to such a method, for example, a method may be used in which a STUN server of a destination is designated by FQDN, and the IP address is resolved by a DNS server.

As described above, the terminal 40A obtains an address (host) A, a first address (srflx) A, and a second address (srflx) A. In FIG. 1, for example, an address of a port indicate by C corresponds to the address (host) A, an address of a port indicate by D corresponds to the second address (srflx) A, and an address of a port indicate by E corresponds to the first address (srflx) A. The address (host) A that is an address of host may exist for each of the first communication network 10 and the second communication network 20. That is, the first address (host) A and the second address (host) A may be acquired as addresses of the host. In this example, a case where one address (host) A is acquired as the address of host is shown as an example.

Next, the terminal 40A calculates a score corresponding to priority of each collected address. As the score calculation method, a method described in section 4.1.2 of the non-patent document 2 can be used. More specifically, the score is calculated from a value of host preference according to the type (host, srflx and the like) (example: host:128, srflx:100) and a value of Local Preference according to an address family (IPv4, IPv6). However, the method of calculating the score is not limited to the method described in Section 4.1.2 of Non-Patent Document 2. Regarding the value of Local preference, it is recommended to use higher value for IPv6 than a value for IPv4 in non-patent document 2, and this recommendation is followed in this embodiment.

Next, in step S102, the terminal 40A transmits addresses (referred to as address candidates) collected in step S101 to the terminal 40B together with the calculated scores. Here, as an example, a message of SDP (Session Description Protocol) offer is used.

More specifically, in step S102, the terminal 40A transmits, to the terminal 40B, "the address (host) A and the score, the first address (srflx) A and the score, the second address (srflx) A and the score" as address candidates.

In step S103, the terminal 40B that receives the SDP offer including the address candidates obtains an address (host) B, a first address (srflx) B and a second address (srflx) B and calculates each score in the same way as address collection and score calculation in the terminal 40A side.

In step S104, the terminal 40B transmits "the address (host) B and the score, the first address (srflx) B and the score, the second address (srflx) B and the score" to the terminal 40A as SDP answers.

Accordingly, each of the terminal 40A and the terminal 40B has its own address candidates and address candidates of the other party. Then, each of the terminal 40A and the terminal 40B generates a combination (set) of address pairs each being a pair of one address of itself and one address of the other party, and calculates scores of each address pair to arrange them in an priority order (this is referred to as a check list). The method described in section 5.7.2 of the non-patent document 2 can be used for the scoring. In this method, basically, as the score of each address forming the pair is higher, higher score can be obtained. However, performing scoring by the method described in 5.7.2 of Non-Patent Document 2 is merely an example, and scoring may be performed by another method.

In step S105, each of the terminal 40A and the terminal 40B performs connection check for each address pair. In the connection check, hole punching using a binding request of STUN is executed. For example, the terminal 40A transmits a binding request to a destination address (referred to as address B) of the terminal 40B in an address pair, and when the terminal 40A receives a binding response, the terminal 40A obtains an address (reflexive address) (this is referred to as address A) included in the binding response. Then, if there is an address pair, in the check list, which matches the pair of the address A and the address B, the connection check of the address pair is successful. Note that connection check may be performed only from the terminal 40A (controlling agent).

Connection check is performed by the above-mentioned method, and for example, the terminal 40A (controlling agent) determines to use, for media communication, an address pair of the highest priority from among address pairs by which connection check succeeds, and notifies the terminal 40B (controlled agent) of the address pair. If the address pair can be used (example: if the address pair is included in address pairs by which connection check from the terminal 40B succeeded), the terminal 40B may determine to use the address pair. Also in the terminal 40B, processing similar to that of the terminal 40A may be executed, and the terminal 40B may decide an address pair for transmission from the terminal 40B. After that, P2P communication using the determined address pair is executed (step S106). For example, the terminal 40A transmits media to a destination address of the determined address pair, and the terminal 40B transmits media to a destination address of the determined address pair.

The address pair used for transmission from the terminal 40A and the address pair used for transmission from the terminal 40B may be the same or different.

The address determination method as described above is merely an example and the address may be determined by another method. Hereinafter, a first example and a second example which are more specific operation examples are described.

First Example

Figure 3:
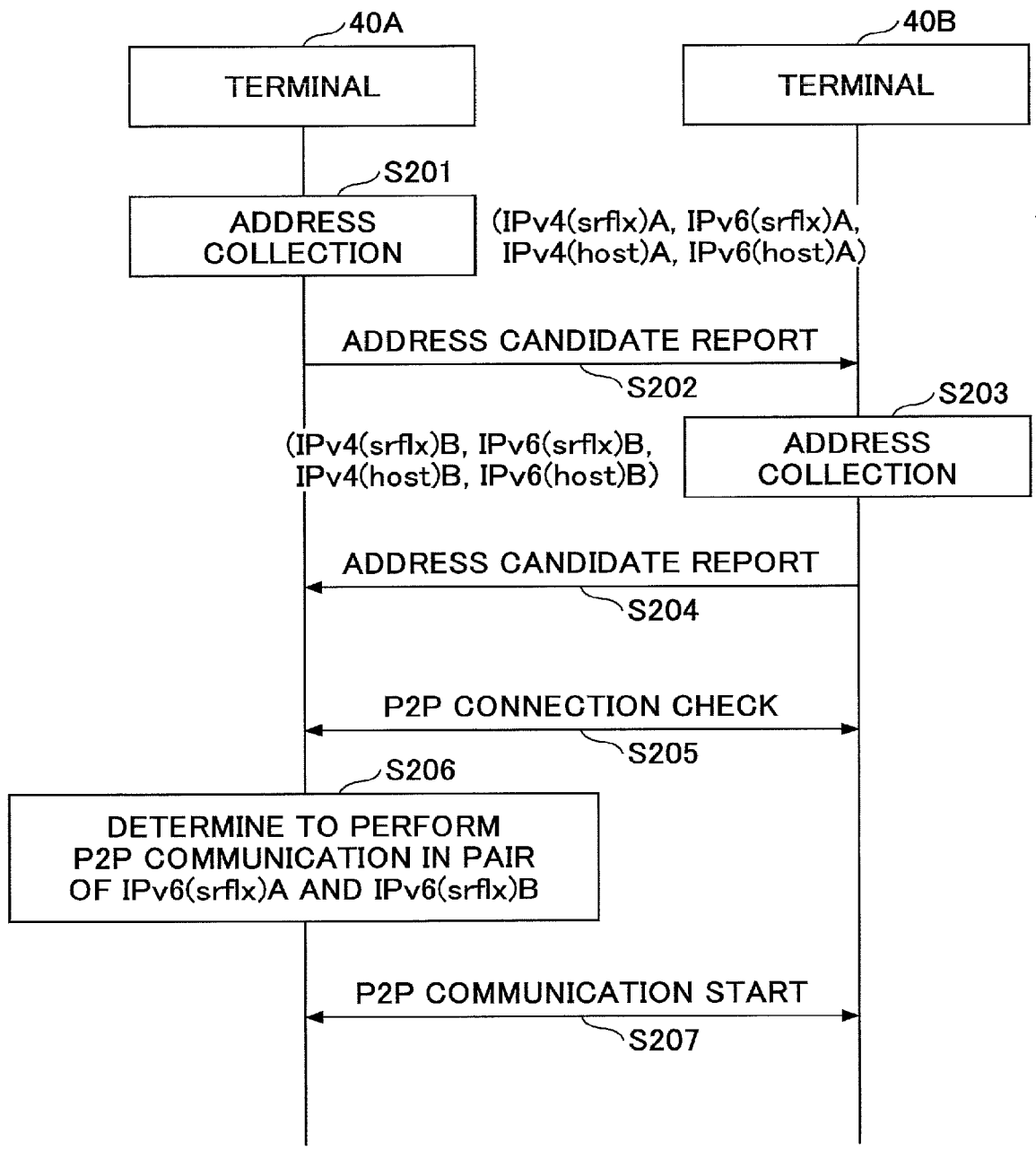
FIG. 3 is a sequence diagram for explaining an operation example in a first example.

In the first example, operation executed between the terminal 40A and the terminal 40B is described with reference to FIG. 3. Although the basic procedure is as described in FIG. 2, in the first example, it is describe that, when the first communication network 10 and the second communication network 20 use a specific IP address, the problem of the conventional technique is solved by a configuration in which a STUN server is provided in each network. As in FIG. 2, the description of the signaling server 30 is omitted in FIG. 3.

In the first example, it is assumed that the first communication network 10 is a network (example: NGN network) that performs routing of packets using IPv6 addresses and the second communication network 20 is a network (example: the Internet) that performs routing of packets using IPv4 addresses.

In step S201, the terminal 40A collects addresses. Here, for example, the terminal 40A is assigned a private (local) IPv4 address and a private IPv6 address from the NAT apparatus 50A, and it is assumed that the IPv4 address and the IPv6 address are obtained as host addresses. These are described as "IPv4 (host) A" and "IPv6 (host) A". Further, the terminal 40A transmits a binding request to each of the STUN server 21 and the STUN server 11, and receives a binding response from each of them, thereby acquiring IPv4 (srflx) A and IPv6 (srflx) A.

The terminal 40A calculates the score of each collected address. Here, the score is calculated in the order of the size of the score indicated as "IPv6 (host) A>IPv4 (host) A>IPv6 (srflx) A>IPv4 (srflx) A".

Next, in step S202, the terminal 40A transmits the address candidates collected in step S201 to the terminal 40B together with calculated scores. More specifically, in step S202, the terminal 40A transmits to the terminal 40B a message including "the IPv6 (host) A and the score, the IPv4 (host) A and the score, the IPv6 (srflx) A and the score, the IPv4 (srflx) A and the score".

In step S203, address collection is performed by the terminal 40B, and in step S204, the terminal 40B transmits to the terminal 40A a message including "the IPv6 (host) B and the score, the IPv4 (host) B and the score, the IPv6 (srflx) B and the score, the IPv4 (srflx) B and the score".

Accordingly, each of the terminal 40A and the terminal 40B has its own address candidates and address candidates of the partner. Then, each of the terminal 40A and the terminal 40B generates a set of address pairs each being a pair of one own address and one partner address, calculates a score for each address pair, arranges the pairs in priority order to make it a check list.

After that, connection check is performed in step S205. Here, for example, it is assumed that connection check succeeds in both of the pair of IPv6 (srflx) A and IPv6 (srflx) B and the pair of IPv4 (srflx) A and IPv4 (srflx) B in the terminal 40A. If it is the same type (srflx), IPv6 has higher priority score. Thus, in step S206, the terminal 40A determines the pair of IPv6 (srflx) A and IPv6 (srflx) B as an address pair for media transmission. Also in the terminal 40B, the address pair is determined in the same procedure, and the P2P communication is started in step S207. Or, the address pair determined by the terminal 40A is notified to the terminal 40B, and the terminal 40B may use the address pair.

In general, IPv4 is used in the Internet, and it is assumed that P2P connection check does not succeed by the host addresses between terminals under NAT apparatuses. Thus, it can be said that the above case of the first example is a case that can occur with high possibility.

In the first example, by adopting the configuration, that the conventional technique does not have, in which the STUN server is provided in each of the first communication network 10 and the second communication network 20, it is possible to execute P2P communication between the terminal 40A and the terminal 40B by a route via the first communication network 10 (example: NGN network).

Also, by adopting the configuration, that the conventional technique does not have, in which the STUN server is provided in each of the first communication network 10 and the second communication network 20, there is an effect in which, if P2P communication cannot be performed in one communication network, P2P communication can be performed by performing fallback to another communication network.

Second Example

Figure 4:
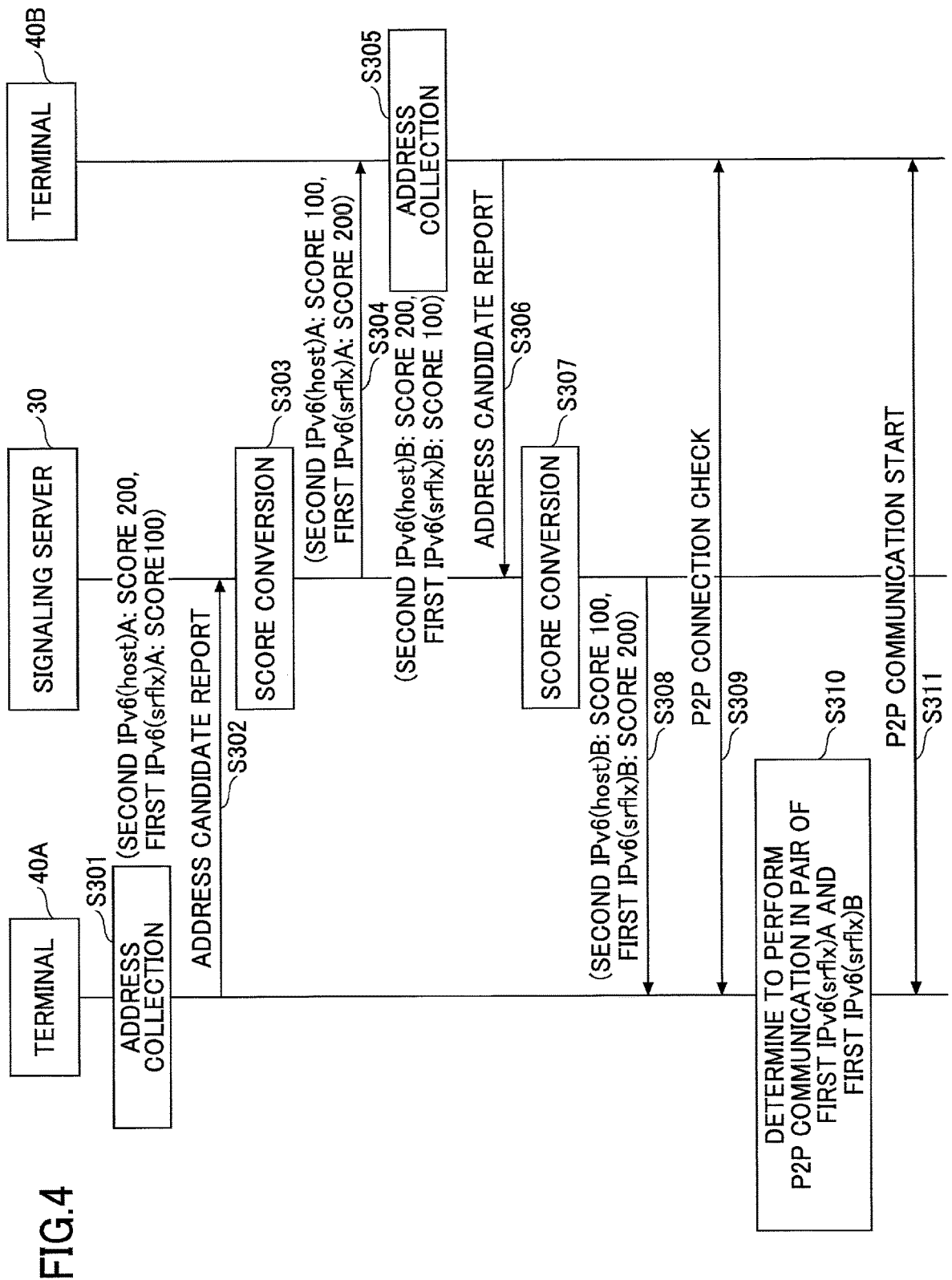
FIG. 4 is a sequence diagram for explaining an operation example in a second example.

Next, operation executed between the terminal 40A and the terminal 40B in the second example is described with reference to FIG. 4. The basic procedure is as described with reference to FIG. 2. However, in the second example, an example is described in which the signaling server 30 converts the score so that the problem of the conventional technique is solved.

In the second example, it is assumed that the first communication network 10 is a network (example: NGN network) in which packet routing is performed using an IPv6 address (this is referred to as first IPv6 address), and the second communication network 20 is a network (example: the Internet) in which packet routing is performed using an IPv6 address (this is referred to as second IPv6 address) of an address band different from that of the first IPv6 address.

In step S301, the terminal 40A collects addresses. Here, for example, it is assumed that a second IPv6 address used in the second communication network 20 is assigned to the terminal 40A and the second IPv6 address is obtained as a host address. This is described as "second IPv6 (host) A". Similar formats are used for others. Further, the terminal 40A transmits a binding request to each of the STUN server 21 and the STUN server 11, and receives a binding response from each of them to obtain a second IPv6 (srflx) A and a first IPv6 (srflx) A.

Here, in the present example, the NAT apparatus 50A performs conversion of a source address for a packet to the first communication network 10 (conversion from second IPv6 to first IPv6), however, does not perform conversion of a source address for a packet to the second communication network 20. Therefore, the second IPv6 (srflx) A is the same as the second IPv6 (host) A, and as a result, the address obtained as the host address is only the second IPv6 (host) A. In such a case, the STUN server 21 may return, instead of the second IPv6 (srflx) A, information indicating that the source address is the host address.

The terminal 40A calculates a score of each collected address. Here, scores are calculated in the order of the size of the score indicated as "second IPv6 (host) A>first IPv6 (srflx) A". In this example, as an example for convenience, the score of the second IPv6 (host) A is 200 and the score of the first IPv6 (srflx) A is 100.

Next, in step S302, the terminal 40A transmits the address candidates collected in step S301 together with the calculated scores. More specifically, in step S302, the terminal 40A transmits a message including "the second IPv6 (host) A and the score 200, and first IPv6 (host) A and the score 100" as address candidates.

The signaling server 30 receives the message and checks the address candidates. The signaling server 30 detects that there are the second IPv6 (host) A and the first IPv6 (srflx) A, and that size relationship of the scores is "second IPv6 (host) A>first IPv6 (srflx) A".

The signaling server 30 includes a function that converts scores such that the score of the address of the second communication network 20 becomes smaller than the score of the address of the first communication network 10 such that P2P communication between terminals passes through the first communication network 10 (example: NGN network) as much as possible. By the function, for example, the signaling server 30 converts the score of the second IPv6 (host) A from 200 to 100, and converts the score of the first IPv6 (srflx) A from 100 to 200 (step S303). Then, the signaling server 30 transfers, to the terminal 40B, the address candidates with the converted scores "the second IPv6 (host) A and the score 100, the first IPv6 (srflx) A and the score 200" (step S304).

The signaling server 30 may also transmit the address candidates with the converted scores "the second IPv6 (host) A and the score 100, the first IPv6 (srflx) A and the score 200" to the terminal 40A. Accordingly, the terminal 40A can use scores after score conversion for source addresses (own addresses) when performing scoring of address pairs. However, the address candidates with the converted scores may not be transmitted to the terminal 40A. In this case, conversion of score is performed such that score conversion functions effectively even if the score after score conversion is not used as to the source address. For example, in the after-mentioned step S307, by converting the score of the destination address (first IPv6 (srflx) B) to a sufficiently large value, a pair including the first IPv6 (srflx) B as a destination address becomes the highest score definitely when the terminal 40A calculates the score of the pair of the destination address and the source address.

In step S305, the terminal 40B collects addresses, and in step S306, the terminal 40B transmits a message including "the second IPv6 (host) B and the score 200, the first IPv6 (srflx) B and the score 100" as address candidates.

In step S307, the signaling server 30 performs score conversion similarly to step S303, and transfers address candidates "the second IPv6 (host) B and the score 100, first IPv6 (srflx) B and the score 200" with converted scores to the terminal 40A (step S308).

The signaling server 30 may also transmit the address candidates "the second IPv6 (host) B and the score 100, the first IPv6 (srflx) B and the score 200" with the converted scores to the terminal 40B. Accordingly, the terminal 40B can use scores after score conversion for source addresses (own addresses) when performing scoring of address pairs. However, the address candidates with the converted scores may not be transmitted to the terminal 40B. In this case, conversion of score is performed such that score conversion functions effectively even if the score after score conversion is not used as to the source address. For example, in the before-mentioned step S303, by converting the score of the destination address (first IPv6 (srflx) A) to a sufficiently large value, a pair including the first IPv6 (srflx) A as a destination address becomes the highest score definitely when the terminal 40B calculates the score of the pair of the destination address and the source address.

Accordingly, each of the terminal 40A and the terminal 40B has its own address candidates and address candidates of the partner. Then, each of the terminal 40A and the terminal 40B generates a set of address pairs each being a pair of one own address and one partner address, calculates a score for each address pair, arranges the pairs in priority order to make it a check list.

After that, connection check is performed in step S309. Here, for example, it is assumed that connection check succeeds in both of the pair of the first IPv6 (srflx) A and the first IPv6 (srflx) B and the pair of second IPv6 (host) A and the second IPv6 (host) B in the terminal 40A. As described before, since score conversion has been performed in the signaling server 30, the score of the pair of the first IPv6 (srflx) A and the first IPv6 (srflx) B is higher than the score of the pair of second IPv6 (host) A and the second IPv6 (host) B. Thus, in step S310, the terminal 40A determines the pair of the first IPv6 (srflx) A and the first IPv6 (srflx) B as an address pair for media transmission. Also in the terminal 40B, the address pair is determined in the same procedure, and the P2P communication is started in step S311. Or, the address pair determined by the terminal 40A is notified to the terminal 40B, and the terminal 40B may use the address pair.

Note that the above-mentioned method for converting the score is merely an example. For example, a conversion method may be adopted to convert a score of an address corresponding to a network through which P2P communication is desired to be passed to a high score (example: to a score of the highest priority).

In the second example, the signaling server 30 performs score conversion so as to enable P2P communication between the terminal 40A and the terminal 40B to be executed via a route passing through the first communication network 10 (example: NGN network).

It is merely an example to execute P2P communication using a route via the first communication network 10 (example: NGN network). For example, it is possible to realize control to cause a part of or all of P2P communications to be executed using the second communication network 20 (the Internet). In order to cause P2P communication to be performed via the second communication network 20 (the Internet), the signaling server 30 may perform address conversion such that the score of the address of the second communication network 20 side becomes higher. Also, for example, depending on the traffic situation of the Internet, if it is desired to change the route via which P2P communication is executed from the second communication network 20 (the Internet) to the first communication network 10 (NGN), setting in the signaling server 30 may be changed so as to perform address conversion such that the score of the address of the first communication network 10 side becomes higher. More specifically, score conversion reference information stores in a data storage unit 33 in the signaling server 30, which is described later, may be set as information indicating that address conversion is performed such that the score of the first communication network 10 side becomes higher.

Note that, also in the first example, the signaling server 30 having functions of the second example may be used. In this case, in the situation of the first example, the signaling server 30 confirms that the score of the address of the first communication network 10 is higher, determines that score conversion is unnecessary, and transfers the address candidates without score conversion.

The configuration shown in FIG. 1 described so far corresponds to a case, as an example, in which the first communication network 10 is an access network, and the second communication network 20 is the Internet. In this case, both of the terminal 40A and the terminal 40B belong to the same access network (the first communication network 10).

The technique according to the present embodiment can be applied not only to the case where the terminal 40 A and the terminal 40 B belong to the same access network. For example, the technique can be also applied to a case in which both the terminals belong to different access networks, and connect to the Internet via these access networks respectively.

In this case, pieces of address information that the both terminals obtain from STUN servers in the access networks respectively are exchanged using the signaling server 30, and P2P connection check is performed. Then, for example, if access networks are inter-connected, or the like, P2P communication via the access networks is executed. On the other hand, if inter-connection or the like is not performed, P2P connection check of another address (for example, internet address) is performed, and if communication is available, connection via the network of the address is established. That is, communication via a connectable network (example: the Internet) can be automatically established as a fallback destination, and service availability is improved.

(Example of P2P Connection Check (Example in Which Connection Cannot be Established by the First Communication Network 10))

Figure 5:
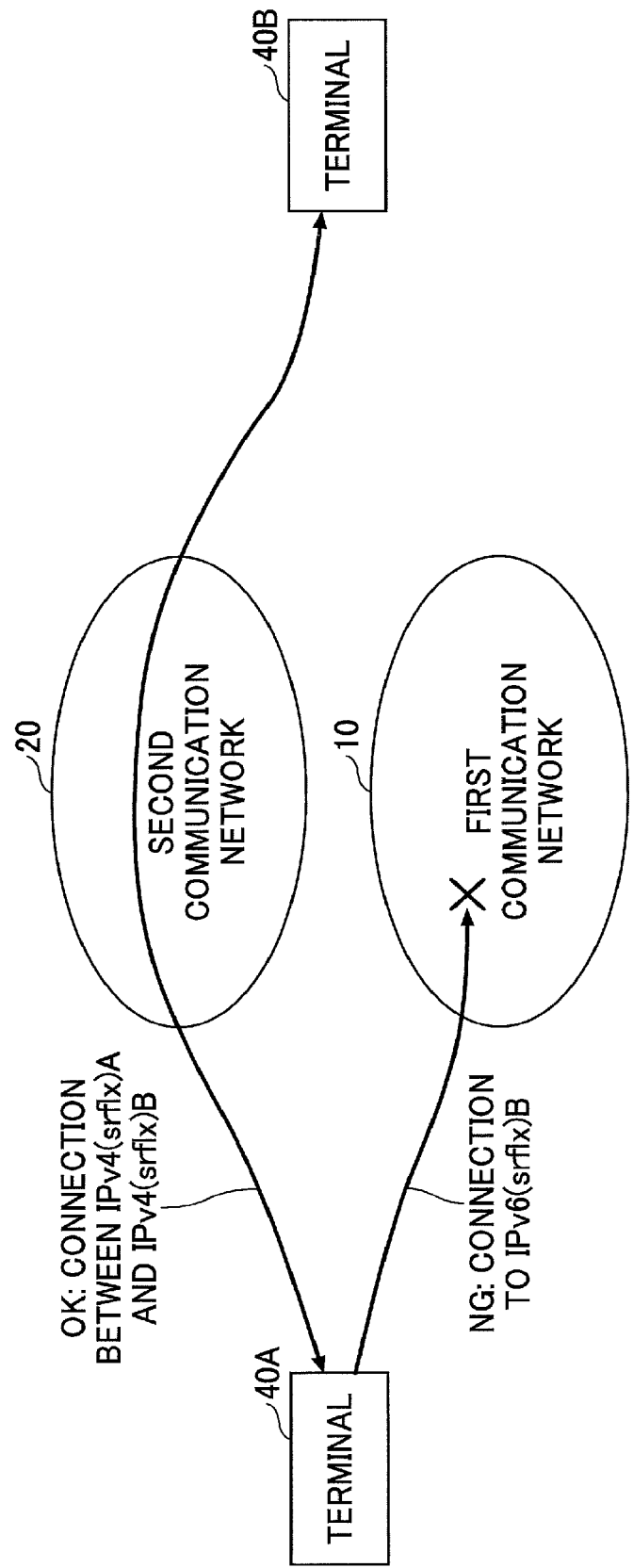
FIG. 5 is a diagram showing an example (example when connection is unavailable in a first communication network)

For example, like the case of the first example, even when the score of the address of the first communication network 10 becomes higher than the score of the address of the second communication network 20, P2P communication on the first communication network 10 cannot be performed unless connection check on the first communication network 10 succeeds. For example, as shown in FIG. 5, there is a case in which connection via the first communication network 10 is rejected. As an example of such a case, for example, there is a case in which P2P communication via the first communication network 10 is not permitted as a policy of the first communication network 10.

As shown in FIG. 5, by using the technique of the present embodiment, even in such a case, connection is established if P2P connection is possible by another address. That is, by the present embodiment, communication via the second communication network 20 (example: the Internet) as a fallback destination can be automatically established, and service availability improves.

(Other Use Cases)

Figure 6:
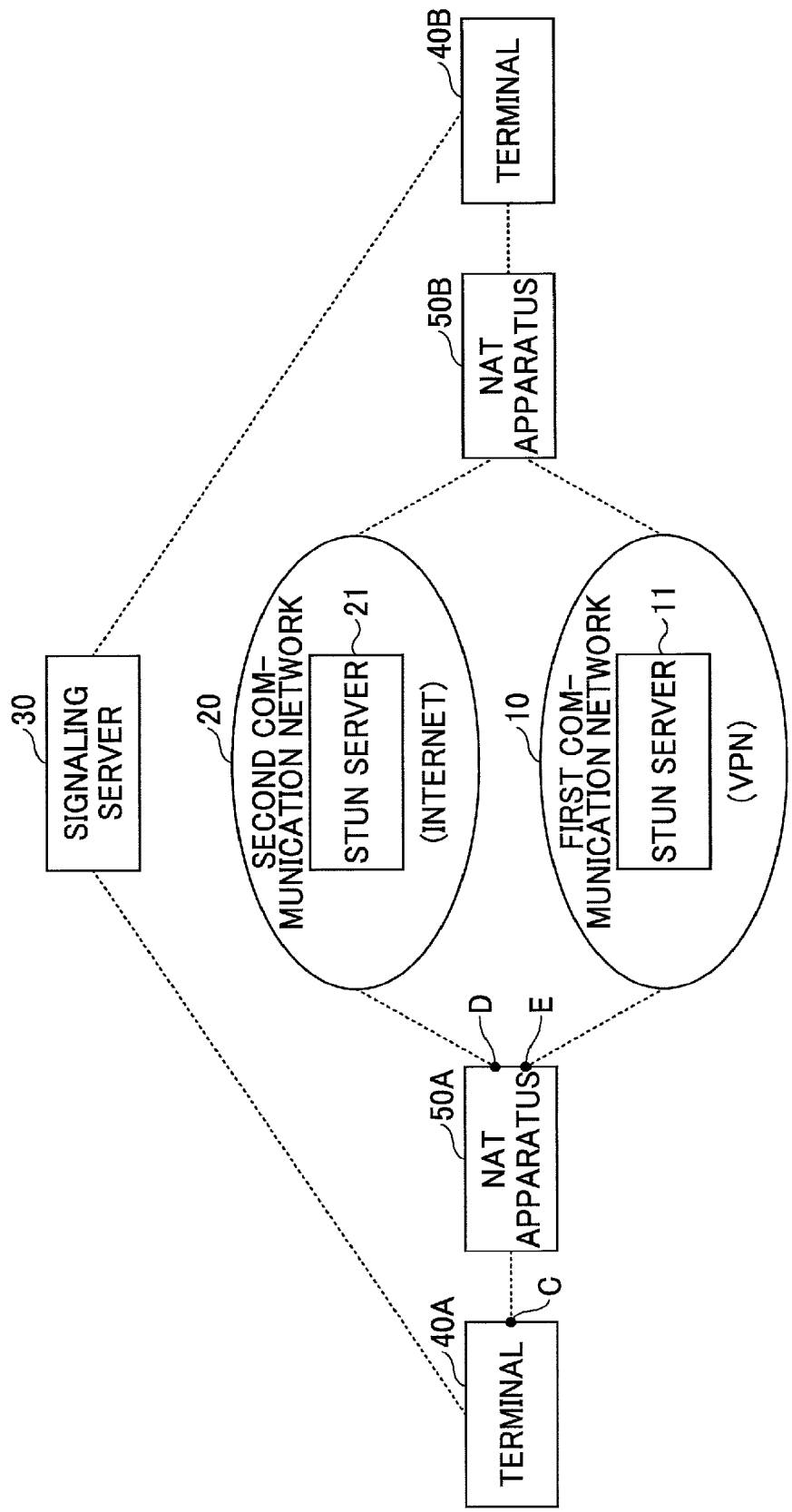
FIG. 6 is a diagram for explaining other use cases.

In the examples described so far, it is assumed that the first communication network 10 is an access network such as the NGN network and the like, and that the second communication network 20 is the Internet. However, such a use case is merely an example. As another use case, for example, as shown in FIG. 6, the first communication network 10 may be a closed network such as VPN and the second communication network 20 may be the Internet. An example of VPN is IP-VPN using MPLS technology. Regarding the address to be used, both the first communication network 10 and the second communication network 20 may be IPv4 or IPv6, or one may be IPv4 and the other may be IPv6.

In the case of this use case, as described in the first example, it is possible to perform operation in which the score conversion is not executed, and it is possible to perform operation in which the score conversion is executed. However, by adopting the operation to perform score conversion, traffic route control as described below can be performed.

That is, in the use case shown in FIG. 6, it is possible to realize a control that causes a part or all of the P2P communications to be performed via the second communication network 20 (the Internet), for example, by performing the score conversion. As described in the second example, in order to cause the P2P communication to be performed via the second communication network 20 (the Internet), the signaling server 30 may perform address conversion such that the score of the address on the side of the second communication network 20 becomes high (the score conversion in S303, S307 in FIG. 4). Also, for example, according to the traffic situation of the Internet, if it is desired to change the network via which P2P communication is performed from the second communication network 20 (the Internet) to the first communication network 10 (closed network), the setting in the signaling server 30 may be changed so as to perform address conversion such that the score of the address in the first communication network 10 side becomes high. More specifically, score conversion reference information stored in the after-mentioned data storage unit 33 of the signaling server 30 may be set as information indicating that address conversion is performed such that the score of the address in the first communication network 10 side becomes high.

As described above, by using the technique of the present embodiment, it is possible to control the traffic route in the same manner as the hybrid WAN or the like which is a use case realized by the SD-WAN (Software Defined WAN) technology simply by controlling the signaling server 30. Such traffic routing control can be realized by SDN (Software-Defined Network) after deploying SD-WAN controller and SD-WAN edges. However, With the technology according to the present embodiment, it is possible to realize this by minimizing the impact on network equipment and applications.

Modified Example 1

Figure 7:
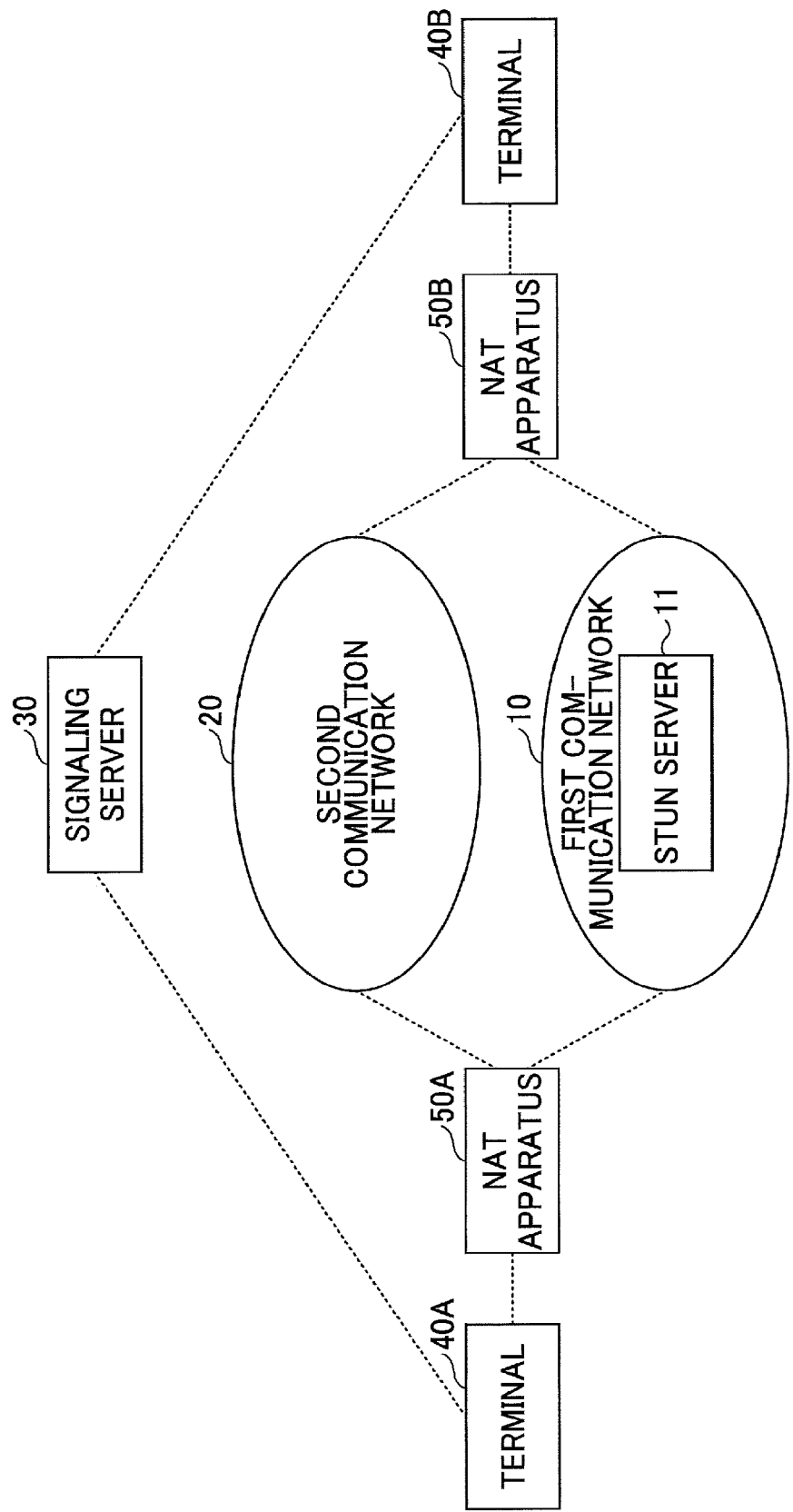
FIG. 7 is a diagram for explaining an example for installing a STUN server in a specific communication network.

In the communication system according to the present embodiment, as shown in FIG. 7, the STUN server 11 may be placed only in the first communication network 10 (example: access network).

In the case of the configuration shown in FIG. 7, P2P connection check between the terminals is performed by the address of the host and the address that can be collected from the STUN server 11 in the first communication network 10. As normally assumed, when the terminal is under the control of the NAT apparatus, P2P communication using the address of host cannot be performed. Therefore, in this case, as long as the P2P communication via the first communication network 10 is not restricted, P2P communication by an address collectable from the STUN server 11, that is, P2P communication via the first communication network 10 is performed.

Even when P2P communication via the first communication network 10 is restricted, if an IPv6 global Internet address is given as an address of host to each terminal, it is possible to perform P2P communication via the second communication network 20 (example: the Internet) by the before-mentioned fallback.

Modified Example 2

Figure 8:
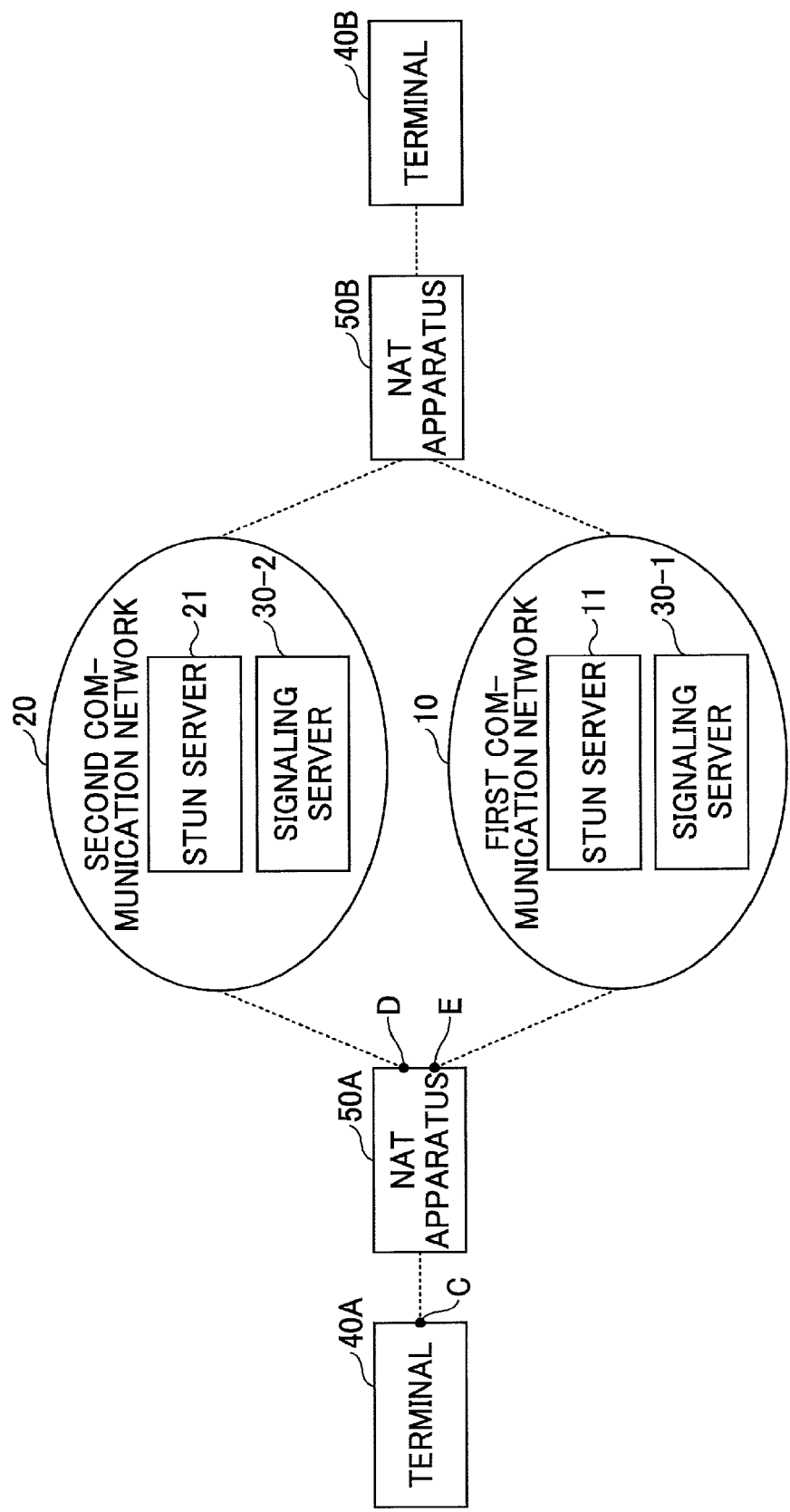
FIG. 8 is a diagram showing a configuration in which a signaling server is provided in each of a first communication network and a second communication network.

In the example described so far, one signaling server 30 is provided without restricting the installment place. However, as shown in FIG. 8, the signaling server 30 may be provided in each network. That is, in the example shown in FIG. 8, a signaling server 30-1 is provided in the first communication network 10, and a signaling server 30-2 is provided in the second communication network 20. In the modified example 2, the first communication network 10 may be an access network such as the NGN network and the like, or a closed network as described with reference to FIG. 6, or another network. In addition, although the second communication network 20 is assumed to be the Internet, it may be a network other than the Internet. Regarding the address to be used, both the first communication network 10 and the second communication network 20 may be IPv4 or IPv6, or one may be IPv4 and the other may be IPv6.

Each of the signaling server 30-1 and the signaling server 30-2 has the same functions as those of the signaling server 30 described above. That is, if only the signaling server 30-1 among the signaling server 30-1 and the signaling server 30-2 is installed, the signaling server 30-1 can execute operation the same as that of the signaling server 30 described in the first example and the second example. Also, if only the signaling server 30-2 among the signaling server 30-1 and the signaling server 30-2 is installed, the signaling server 30-2 can execute operation the same as that of the signaling server 30 described in the first example and the second example.

In the modified example 2, any of the operation that does not perform the score conversion as described in the first example and the operation that performs the score conversion as described in the second example can be applied.

In the modified example 2, each of the terminal 40A and the terminal 40B registers to each of the signaling server 30-1 and the signaling server 30-2, respectively, and communicates with each of the signaling server 30-1 and the signaling server 30-2. For example, in the case in which the operation not to perform score conversion described in the first example is applied, the terminal 40A and the terminal 40B executes the operation of the sequence described with reference to FIG. 3 using the signaling server 30-1 and executes the operation of the sequence described with reference to FIG. 3 using the signaling server 30-2. The address collection (S201, S203) of the side of the terminal itself may be performed for each of the signaling server 30-1 and the signaling server 30-2, or may be performed once for the signaling server 30-1 and the signaling server 30-2.

If both of the sequence using the signaling server 30-1 and the sequence using the signaling server 30-2 are executed normally, there occurs two P2P communication connections (sessions), which are P2P communication connection established between the terminal 40A and the terminal 40B by the sequence using the signaling server 30-1 and P2P communication connection established between the terminal 40A and the terminal 40B by the sequence using the signaling server 30-2.

If the signaling servers 30-1 and 30-2 perform the same operation without performing score conversion, two different P2P communication connections via the same communication network are established. In this case, the terminal 40A (or the terminal 40B) disconnects one of the two different P2P communication connections. For example, the terminal 40A (or the terminal 40B) disconnects one at random since the score of the address pair is expected to be the same between the two different P2P communication connections.

Instead of the operation as described above, the terminal 40A (and the terminal 40B) may perform one P2P communication connection using an address pair of higher score from among the address pair determined by the sequence using the signaling server 30-1 and the address pair determined by the sequence using the signaling server 30-2.

Also, in the case in which the operation to perform score conversion as described in the second example is applied, the terminal 40A and the terminal 40B executes the operation of the sequence described with reference to FIG. 4 using the signaling server 30-1, and also executes the operation of the sequence described with reference to FIG. 4 using the signaling server 30-2. The address collection (S301, S305) of the side of the terminal itself may be performed for each of the signaling server 30-1 and the signaling server 30-2, or may be performed once for the signaling server 30-1 and the signaling server 30-2.

If both of the sequence using the signaling server 30-1 and the sequence using the signaling server 30-2 are executed normally, there occurs two P2P communication connections, which are P2P communication connection established between the terminal 40A and the terminal 40B by the sequence using the signaling server 30-1 and P2P communication connection established between the terminal 40A and the terminal 40B by the sequence using the signaling server 30-2.

For example, if the signaling servers 30-1 and 30-2 perform the same score conversion, two different P2P communication connections via the same communication network are established. In this case, the terminal 40A (or the terminal 40B) disconnects one of the two different P2P communication connections. For example, the terminal 40A (or the terminal 40B) disconnects one at random since the score of the address pair is expected to be the same between the two different P2P communication connections.

In the case in which the signaling server 30-1 and the signaling server 30-2 perform score conversion by different rules, if two different P2P communication connections are established, the terminal 40A (or the terminal 40B) disconnects, for example, a P2P communication connection of lower score of address pair between the two different P2P communication connections. In the case in which two different P2P communication connections passing through different communication networks are established, one P2P communication connection may be disconnected based on the score, or a communication network to disconnect may be predetermined so that a P2P communication connection via the communication network may be disconnected.

Instead of the operation as described above, the terminal 40A (and the terminal 40B) may perform one P2P communication connection using an address pair of higher score from among the address pair determined by the sequence using the signaling server 30-1 and the address pair determined by the sequence using the signaling server 30-2.

In each of the case in which the operation of the first example is applied and the case in which the operation of the second example is applied, when connection from the terminal 40A (terminal 40B) to the second communication network 20 is not possible, a P2P communication connection based on the address pair determined by the sequence using the signaling server 30-1 is established. In such a case, if the signaling server 30 is provided only in the second communication network 20, since execution of signaling is not possible, P2P communication connection cannot be performed for any of the first communication network 10 and the second communication network 20. On the other hand, like the modified example 2, by providing the signaling server 30 in each network, even if connection to one network is unavailable, P2P communication using another network can be performed.

(Apparatus Configuration Example)

Hereinafter, configuration examples of the apparatuses used in the present embodiment are described. The configuration of each apparatus described below with reference to figures shows only the main configuration related to the present embodiment, and each apparatus is provided with existing functions, not shown in the figures, necessary for the apparatus to actually operate.

<Terminal>

Figure 9:
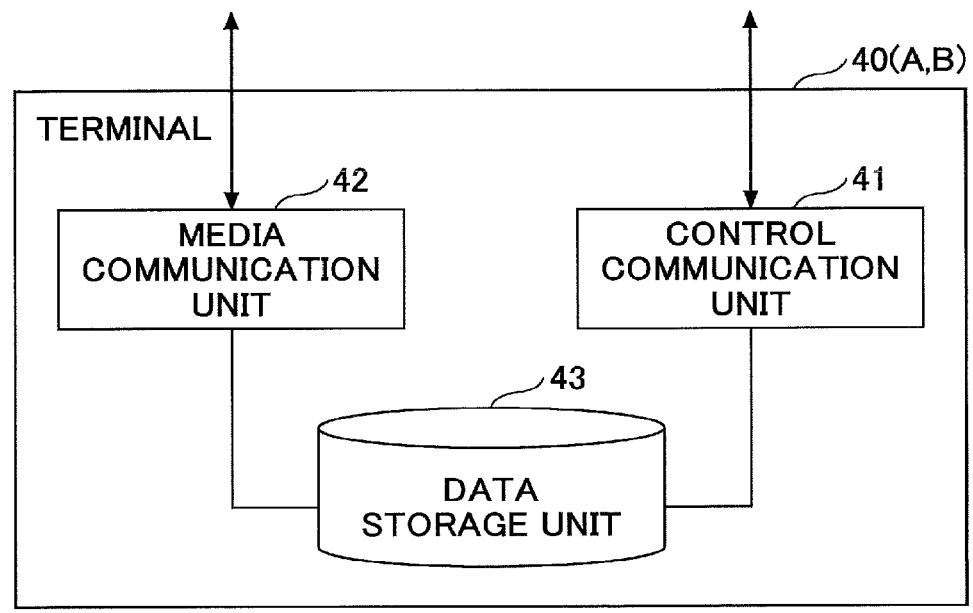
FIG. 9 is a block diagram of a terminal 40.

FIG. 9 shows a configuration example of the terminal 40 (A, B) that executes processing described in the present embodiment. Since the terminal 40A and the terminal 40B have the same configuration, it is described as "terminal 40 (A, B)". In the following description, it is described as "terminal 40".

As shown in FIG. 9, the terminal 40 includes a control communication unit 41, a media communication unit 42, and a data storage unit 43. As described so far, the control communication unit 41 determines an address to be used for P2P communication of media (video, voice, data and the like) by performing transmission and reception of a control signal with the STUN servers 11 and 21, and the signaling servers 30, 30-1, and 30-2. The media communication unit 42 performs P2P communication by using the address determined by the control communication unit 41.

The data storage unit 43 stores the address of the STUN server 11, 21, the address of the signaling server 30, 30-1, 30-2, the address of the DNS server and the like that the control communication unit 41 should access. The control communication unit 41 communicates with the STUN server 11, 21 and the signaling server 30, 30-1, 30-2 by using the address of the STUN server 11, 21 and the address of the signaling server 30, 30-1, 30-2.

When designating the STUN server 11, 21 using a FQDN, for example, a user enters the FQDN in the control communication unit 41. Or, the FQDN is stored in the data storage unit 43 and the control communication unit 41 obtains the FQDN from the data storage unit 43. Then, the control communication unit 41 accesses the DNS server using the address of the DNS server stored in the data storage unit 43 to perform address resolution and accesses the STUN server 11, 21.

The terminal 40 in the present embodiment can be realized, for example, by causing a computer to execute a program which describes the process content described in the present embodiment. More specifically, the functions of the terminal 40 can be realized by executing a program corresponding to processes performed by the terminal 40 by using hardware resources such as a CPU, a memory, and a hard disk and the like in the computer. The program can be saved and distributed by recording the program in a computer readable recording medium (such as portable memory). Also, the program can be provided via a network such as the Internet, an electronic mail and the like.

For example, when WebRTC is used as a P2P communication technology, the terminal 40 can be realized by a terminal including a browser or software having a WebRTC communication function equivalent to a browser. The terminal is, for example, a PC or a smartphone, a mobile phone, or an IoT/M2M device such as a sensor/actuator, or the like. When using the WebRTC, first, the terminal 40 obtains a program (Web application) from a server and the like provided in the first communication network 10, the second communication network 20 or other networks, and the program is executed in the terminal 40 so that the control communication and the like is executed.

<Signaling Server>

Figure 10:
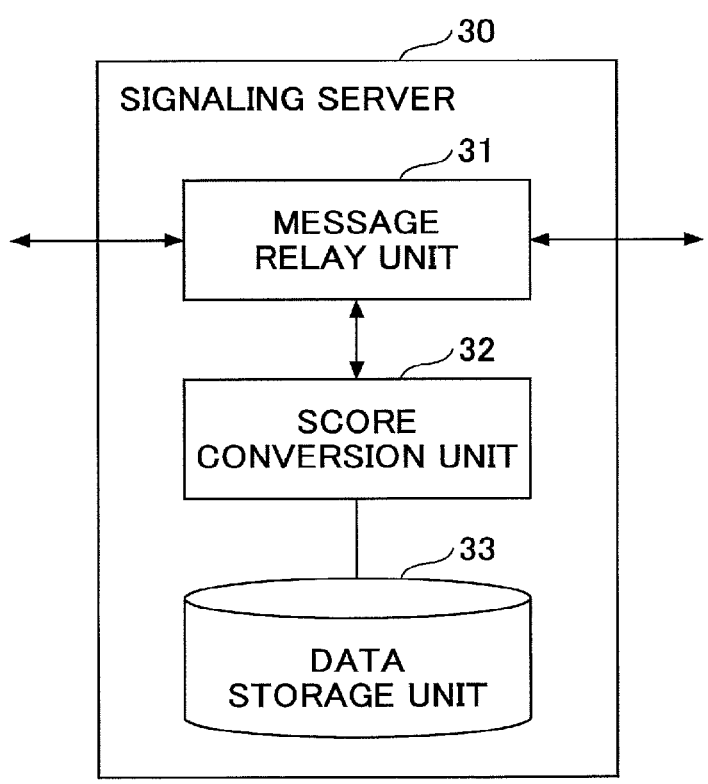
FIG. 10 is a block diagram of a signaling server 30.

FIG. 10 shows a configuration example of the signaling server 30 that executes processing described in the present embodiment. Note that the signaling server 30-1, 30-2 has the same configuration as that of the signaling server 30. As shown in FIG. 10, the signaling server 30 has a message relay unit 31, a score conversion unit 32, and a data storage unit 33.

The message relay unit 31 performs relay of the message including address candidates and the like exchanged between terminals. The score conversion unit 32 performs score conversion described in the second example. That is, the score conversion unit 32 performs conversion of a score such that P2P communication between terminals passes through a predetermined communication network (example: the first communication network 10). Note that to convert a score such that the P2P communication passes through the first communication network 10 is merely an example, and how the score is to be converted can be changed by setting.

As an example, in the case in which there are three networks of a network 1, a network 2 and a network 3 as a network P2P communication may pass through, if the P2P communication is desired to be passed through the network 2 preferentially, information of the address of the network 2 (example: address band of the network 2) and a command is set to perform score conversion such that the score of the address of the network 2 becomes higher than that of addresses of other networks. Accordingly, the score conversion unit 32 checks the address in the address candidates received from the terminal and converts the score of the address when detecting the address corresponding to the address band of the network 2. If the score is one for the P2P communication to pass through the network 2 without conversion, the conversion is not performed.

The data storage unit 33 stores, for example, the information (address information, score conversion rule, etc.) related to the above setting. Since this information is the reference information for score conversion, it is referred to as score conversion reference information. The score conversion unit 32 can appropriately convert the score by referring to the score conversion reference information stored in the data storage unit 33. The functional unit corresponding to the data storage unit 33 may be provided as a separate server (external server) outside the signaling server 30. In the case, the signaling server 30 accesses the external server via the communication network, acquires the score conversion reference information from the external server, and performs score conversion based on the score conversion reference information.

The signaling server 30 in the present embodiment can be realized, for example, by causing one or more computers to execute a program which describes the process content described in the present embodiment. More specifically, the functions of the signaling server 30 can be realized by executing a program corresponding to processes performed by the signaling server 30 by using hardware resources such as a CPU, a memory, and a hard disk and the like in the computer. The program can be saved and distributed by recording the program in a computer readable recording medium (such as portable memory). Also, the program can be provided via a network such as the Internet, an electronic mail and the like.

<STUN Server>

Figure 11:
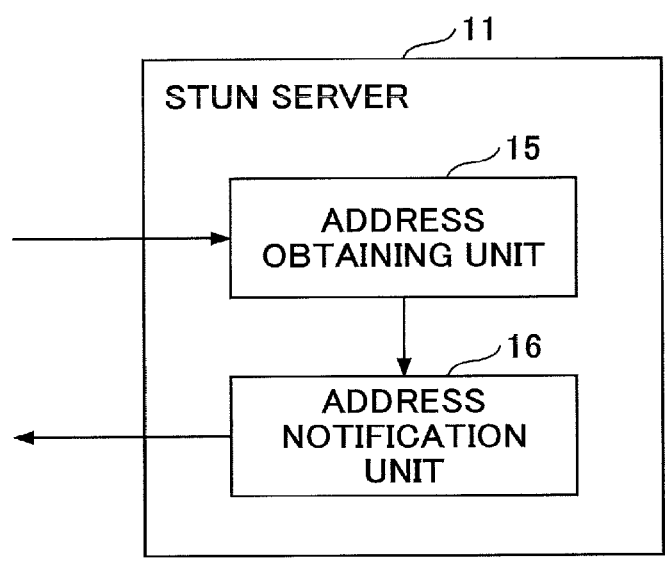
FIG. 11 is a block diagram of a STUN server 11.

FIG. 11 shows a block diagram of the STUN server 11. Since the STUN server 21 has the same configuration, the STUN server 11 is shown in FIG. 11 as a representative. As shown in FIG. 11, the STUN server 11 includes an address obtaining unit 15 and an address notification unit 16.

The address obtaining unit 15 receives a binding request transmitted from the terminal, and acquires the source address (example: the address outside the NAT in the case of via NAT) of the binding request. The address notification unit 16 generates a binding response including the source address obtained by the address obtaining unit 15, and transmits the binding response to the source address (that is, to a terminal of the source).

The STUN server 11 in the present embodiment can be realized, for example, by causing one or more computers to execute a program which describes the process content described in the present embodiment. More specifically, the functions of the STUN server 11 can be realized by executing a program corresponding to processes performed by the STUN server 11 by using hardware resources such as a CPU, a memory, and a hard disk and the like in the computer. The program can be saved and distributed by recording the program in a computer readable recording medium (such as portable memory). Also, the program can be provided via a network such as the Internet, an electronic mail and the like.

<Hardware Configuration Example>

In the case when the each apparatus (the terminal 40, the signaling server 30, the STUN server 11) is realized by a computer, FIG. 12 is a diagram illustrating an example of a hardware configuration of the apparatus. The apparatus (the terminal 40, the signaling server 30, or the STUN server 11) shown in in FIG. 12 includes a drive device 150, an auxiliary storage device 152, a memory device 153, a CPU 154, an interface device 155, a display device 156 and an input device 157 and the like, which are mutually connected by a bus B.

A program that implements processing on the apparatus is provided by a recording medium 151 such as a CD-ROM or a memory card or the like. When the recording medium 151 storing the program is set in the drive device 150, the program is installed into the auxiliary storage device 152 from the recording medium 151 via the drive device 150. However, installation of the program is not necessarily executed from the recording medium 151, and may also be downloaded from another computer via the network. The auxiliary storage device 152 stores the installed program, and stores required files, data, and the like as well.

Upon receiving a command to activate the program, the memory device 153 reads the program from the auxiliary storage device 152, to load the program. The CPU 154 realizes a function which relates to the apparatus according to the program stored in the memory device 153. The interface device 155 is used as an interface for connecting with the network. The display device 156 displays a GUI (Graphical User Interface) and the like by the program. The input device 157 is formed by a keyboard and a mouse, a button or a touch panel and the like, and is used by inputting various operation instructions.

SUMMARY OF EMBODIMENT

As described above, in the present embodiment, there is provided a communication system including a first address notification apparatus provided in a first communication network, and a second address notification apparatus provided in a second communication network, wherein the first address notification apparatus includes means that receives an address request from a terminal that can communicate with the first address notification apparatus and with the second address notification apparatus, obtains a source address from the address request, and transmits a response including the source address to the terminal, and the second address notification apparatus includes means that receives an address request from the terminal, obtains a source address from the address request, and transmits a response including the source address to the terminal.

The communication system may include a communication control apparatus, and the communication control apparatus is configured to receive, from the terminal, a set of addresses including addresses notified to the terminal from the first address notification apparatus and the second address notification apparatus, and transmit the set of addresses to a communication partner terminal that is a communication partner of the terminal.

The communication control apparatus may be configured to convert a score of at least one address among scores indicating priority added to each address of the set of addresses such that communication between the terminal and the communication partner terminal passes through a predetermined communication network. At this time, the communication control apparatus may be configured to obtain score conversion reference information from an external server, and convert the score based on the score conversion reference information.

Also, according to the present embodiment, there is provided an address notification apparatus functioning as a first address notification apparatus provided in a first communication network in a communication system including the first address notification apparatus provided in the first communication network, and a second address notification apparatus provided in a second communication network, including:

obtaining means that receives an address request from a terminal being able to communicate with the first address notification apparatus and with the second address notification apparatus, transmitting an address request to the second address notification apparatus and transmitting an address request to the first address notification apparatus, and obtains a source address from the address request; and address notification means that transmits a response including the source address to the terminal.

Also, according to the present embodiment, there is provided a communication control apparatus for use in a communication system including the communication control apparatus, a first address notification apparatus provided in a first communication network, and a second address notification apparatus provided in a second communication apparatus, including:

relay means that receives a set of addresses from a terminal that can communicate with the first address notification apparatus and the second address notification apparatus, and transmits the set of addresses to a communication partner terminal that is a communication partner of the terminal, wherein the set of addresses includes an address obtained from a response to an address request that is transmitted to the first address notification apparatus from the terminal, and an address obtained from a response to an address request that is transmitted to the second address notification apparatus from the terminal.

The communication control apparatus may further includes conversion means that converts a score of at least one address among scores indicating priority added to each address of the set of addresses such that communication between the terminal and the communication partner terminal passes through a predetermined communication network.

Also, according to the present embodiment, there is provided a terminal that performs control communication with a communication system including a communication control apparatus, a first address notification apparatus provided in a first communication network, and a second address notification apparatus provided in a second communication network, including:

means that transmits an address request to the first address notification apparatus, receives a response including a source address of the address request from the first address notification apparatus, and obtains the source address from the response;

means that transmits an address request to the second address notification apparatus, receives a response including a source address of the address request from the second address notification apparatus, and obtains the source address from the response; and means that transmits, to the communication control apparatus, a set of addresses including the addresses obtained from each of the responses received from the first address notification apparatus and the second address notification apparatus, wherein the communication control apparatus transmits the set of addresses received from the terminal to a communication partner terminal that is a communication partner of the terminal.

The terminal may further includes means that receives a set of addresses obtained by the communication partner terminal from the communication control apparatus, and determines a pair of addresses to be used for communication with the communication partner terminal based on the set of addresses and the set of addresses obtained by the terminal.

Also, according to the present embodiment, there is provided a communication system including a first communication control apparatus and a first address notification apparatus that are provided in a first communication network, and a second communication control apparatus and a second address notification apparatus that are provided in a second communication network, each of the first communication control apparatus and the second communication control apparatus including relay means that receives a set of addresses from a terminal that can communicate with the first address notification apparatus and the second address notification apparatus, and transmits the set of addresses to a communication partner terminal that is a communication partner of the terminal, wherein the set of addresses includes an address obtained from a response to an address request that is transmitted to the first address notification apparatus from the terminal, and an address obtained from a response to an address request that is transmitted to the second address notification apparatus from the terminal.

Each of the first communication control apparatus and the second communication control apparatus may include conversion means that converts a score of at least one address among scores indicating priority added to each address of the set of addresses such that communication between the terminal and the communication partner terminal passes through a predetermined communication network.

Effect of Embodiment

According to the described techniques in the present embodiment, a communication route to be used for P2P communication between terminals is properly selected. As a result, for example, quality of P2P communication can be enhanced. Also, even when a communication route selected with the highest priority cannot be connected, P2P communication can be performed by performing fallback to another communication route, so that the service availability can be enhanced.

By adopting a configuration in which a signaling server is provided in each communication network, it is possible to avoid that P2P communication connection cannot be performed at all when, for example, connection to the Internet cannot be performed.

The present invention is not limited to the specifically disclosed embodiment, and variations and modifications may be made without departing from the scope of the claims.

The present patent application claims priority based on Japanese patent application No. 2015-203061, filed in the JPO on Oct. 14, 2015, and Japanese patent application No. 2016-201841, filed in the JPO on Oct. 13, 2016, and the entire contents of the Japanese patent application No. 2015-203061 and the Japanese patent application No. 2016-201841 are incorporated herein by reference.

DESCRIPTION OF REFERENCE SIGNS

10 first communication network
11 STUN server
15 address obtaining unit
16 address notification unit
20 second communication network
21 STUN server
30, 30-1, 30-2 signaling server
31 message relay unit
32 score conversion unit
33 data storage unit
40A, 40B terminal
41 control communication unit
42 media communication unit
43 data storage unit
50A, 50B NAT apparatus

The invention claimed is:

1. A communication system comprising:
a first address notification apparatus provided in a first communication network;
a second address notification apparatus provided in a second communication network that is different from the first communication network; and
a communication control apparatus,
wherein the first address notification apparatus is a Session Traversal Utilities for NAT (STUN) server that includes circuitry that receives an address request from a terminal that can communicate with the first address notification apparatus and with the second address notification apparatus, obtains a first source address from the address request, the first source address being an address that is used as a source address of the terminal on a side of the first communication network, and transmits a response including the first source address to the terminal, and
the second address notification apparatus is a STUN server includes circuitry that receives an address request from the terminal, obtains a second source address from the address request, the second source address being an external address that is used as a source address of the terminal on a side of the second communication network, and transmits a response including the second source address to the terminal,
wherein the communication control apparatus is configured to
receive, from the terminal, a set of addresses including addresses notified to the terminal from the first address notification apparatus and the second address notification apparatus and scores indicating priority added to each address,
convert a score, of at least one address, that is calculated based on an ICE protocol such that communication between the terminal and a communication partner terminal that is a communication partner of the terminal passes through the first communication network,
transmit the set of addresses and the scores including the converted score to the communication partner terminal,
receive, from the communication partner terminal, a second set of addresses including addresses notified to the communication partner terminal from the first address notification apparatus and the second address notification apparatus and scores indicating priority added to each address,
convert a score, of at least one address among the second set of addresses, that is calculated based on an ICE protocol such that communication between the terminal and the communication partner terminal passes through the first communication network, and
transmit the second set of addresses and the scores including the converted score to the terminal.

2. The communication system as claimed in claim 1, wherein the communication control apparatus is configured to obtain score conversion reference information from an external server, and convert the score based on the score conversion reference information.

3. The communication system as claimed in claim 1, wherein the communication control apparatus is configured to convert scores such that communication between the terminal and the communication partner terminal passes through the first communication network based on a changeable setting stored in the communication control apparatus.

4. A communication control apparatus for use in a communication system including the communication control apparatus, a first address notification apparatus provided in a first communication network, and a second address notification apparatus provided in a second communication network that is different from the first communication network, comprising:
  circuitry configured to receive a set of addresses from a terminal that can communicate with the first address notification apparatus that is a Session Traversal Utilities for NAT (STUN) server and the second address notification apparatus that is a STUN server, and transmits the set of addresses to a communication partner terminal that is a communication partner of the terminal,
  wherein the set of addresses includes a first source address obtained from a response to an address request that is transmitted to the first address notification apparatus from the terminal, the first source address being an address that is used as a source address of the terminal on a side of the first communication network, and a second source address obtained from a response to an address request that is transmitted to the second address notification apparatus from the terminal, the second source address being an external address that is used as a source address of the terminal on a side of the second communication network,
  wherein the circuitry converts a score, that is calculated based on an ICE protocol, of at least one address among scores indicating priority added to each address of the set of addresses such that communication between the terminal and the communication partner terminal passes through the first communication network,
  wherein the circuitry is further configured to
  receive, from the communication partner terminal, a second set of addresses including addresses notified to the communication partner terminal from the first address notification apparatus and the second address notification apparatus and scores indicating priority added to each address, and
  convert a score, of at least one address among the second set of addresses, that is calculated based on an ICE protocol such that communication between the terminal and the communication partner terminal passes through the first communication network.

5. A non-transitory computer readable recording medium storing a program for causing a computer to function as each unit in the communication control apparatus as claimed in claim 4.

6. A communication method executed in a communication system including a first address notification apparatus provided in a first communication network, a second address notification apparatus provided in a second communication network that is different from the first communication network, and a communication control apparatus,
  wherein the first address notification apparatus is a Session Traversal Utilities for NAT (STUN) server that includes circuitry that receives an address request from a terminal that can communicate with the first address notification apparatus and with the second address notification apparatus, obtains a first source address from the address request, the first source address being an address that is used as a source address of the terminal on a side of the first communication network, and transmits a response including the first source address to the terminal, and
  the second address notification apparatus is a STUN server includes circuitry that receives an address request from the terminal, obtains a second source address from the address request, the second source address being an external address that is used as a source address of the terminal on a side of the second communication network, and transmits a response including the second source address to the terminal,
  wherein the communication control apparatus performs
    receiving, from the terminal, a set of addresses including addresses notified to the terminal from the first address notification apparatus and the second address notification apparatus and scores indicating priority added to each address,
    converting a score, of at least one address, that is calculated based on an ICE protocol such that communication between the terminal and a communication partner terminal that is a communication partner of the terminal passes through the first communication network,
    transmitting the set of addresses and the scores including the converted score to the communication partner terminal,
    receiving, from the communication partner terminal, a second set of addresses including addresses notified to the communication partner terminal from the first address notification apparatus and the second address notification apparatus and scores indicating priority added to each address,
    converting a score, of at least one address among the second set of addresses, that is calculated based on an ICE protocol such that communication between the terminal and the communication partner terminal passes through the first communication network, and
    transmitting the second set of addresses and the scores including the converted score to the terminal.

7. A communication system including a first communication control apparatus and a first address notification apparatus that are provided in a first communication network, and a second communication control apparatus and a second address notification apparatus that are provided in a second communication network,
  each of the first communication control apparatus and the second communication control apparatus comprising circuitry configured to receive a set of addresses from a terminal that can communicate with the first address notification apparatus that is a Session Traversal Utilities for NAT (STUN) server and the second address notification apparatus that is a STUN server, and transmit the set of addresses to a communication partner terminal that is a communication partner of the terminal,
  wherein the set of addresses includes a first source address obtained from a response to an address request that is transmitted to the first address notification apparatus from the terminal, the first source address being an address that is used as a source address of the terminal on a side of the first communication network, and a second source address obtained from a response to an address request that is transmitted to the second address notification apparatus from the terminal, the second source address being an external address that is used as a source address of the terminal on a side of the second communication network, each of the first communication control apparatus and the second communication control apparatus comprising circuitry that converts a score, that is calculated based on an ICE protocol, of at least one address among scores indicating priority added to each address of the set of addresses such that communication between the terminal and the communication partner terminal passes through the first communication network, wherein the circuitry is further configured to receive, from the communication partner terminal, a second set of addresses including addresses notified to the communication partner terminal from the first address notification apparatus and the second address notification apparatus and scores indicating priority added to each address, and convert a score, of at least one address among the second set of addresses, that is calculated based on an ICE protocol such that communication between the terminal and the communication partner terminal passes through the first communication network.

\* \* \* \* \*